United States Patent [19]

Staggs et al.

[11] Patent Number: 5,386,503
[45] Date of Patent: Jan. 31, 1995

[54] METHOD FOR CONTROLLING WINDOW DISPLAYS IN AN OPEN SYSTEMS WINDOWS ENVIRONMENT

[75] Inventors: Kevin P. Staggs, Peoria; Laurence A. Clawson, Cave Creek, both of Ariz.

[73] Assignee: Honeywell Inc., Minneapolis, Minn.

[21] Appl. No.: 899,441

[22] Filed: Jun. 16, 1992

[51] Int. Cl.$^6$ .............................................. G06F 15/62
[52] U.S. Cl. .................................. 395/157; 395/161; 395/200
[58] Field of Search .................... 395/155–161, 395/200, 162, 375, 325; 345/118–119, 120, 200, 117; 370/85.4, 825.52, 423

[56] References Cited

U.S. PATENT DOCUMENTS

| | | | |
|---|---|---|---|
| 4,296,464 | 10/1981 | Woods et al. | 395/325 |
| 4,556,974 | 12/1985 | Kozlik | 370/85.4 |
| 4,607,256 | 8/1986 | Henzel | 340/825.52 |
| 4,663,619 | 5/1987 | Staggs et al. | 345/200 |
| 4,709,347 | 11/1987 | Kirk | 395/200 |
| 4,962,473 | 10/1990 | Crain | 364/423 |
| 4,974,173 | 11/1990 | Stefik et al. | 395/157 X |
| 5,043,919 | 8/1991 | Callaway et al. | 395/162 X |
| 5,050,104 | 9/1991 | Heyen et al. | 395/162 |
| 5,226,118 | 7/1993 | Baker et al. | 395/161 |
| 5,276,801 | 1/1994 | Heyen et al. | 395/162 |
| 5,295,244 | 3/1994 | Deu et al. | 395/161 |
| 5,297,252 | 3/1994 | Becker | 395/160 |

OTHER PUBLICATIONS

Dolan et al, "X Window System Servers in Embedded Systems", COMPCON, Mar. 1990, pp. 314–319.
Treadway, "Working With Windows", Computer Graphics World, Sep. 1988, pp. 79–86.
Jones, "Introduction to the X Window System", MIT and DEC, 1989, pp. 27–64.
Sing et al, "A Critical Evaluation of PEX", IEEE Comp. Grph. and Appl., Nov. 1990, pp. 65–75.
Scheifler et al, "X Window System", MIT and DEC, 1988, pp. 1–117, 166–173, 280–285, 290–297, 306–307, 352–353, 420–429.

Primary Examiner—Mark R. Powell
Assistant Examiner—John E. Breene
Attorney, Agent, or Firm—A. A. Sapelli; William Udseth; A. Medved

[57] ABSTRACT

The method guarantees the integrity of a process control systems display in an open system windows environment. The process control system includes an interface apparatus to at least one foreign system, and receives display information such that the display information from the foreign systems and the display information from a network of the process control system are displayed on a display unit of the process control system in a windows format in response to control information from the interface apparatus. The interface apparatus transmits the display information of the foreign systems to a display generator unit via a first input channel of the display generator unit. Control information is also transmitted to the display generator unit via the first input channel to command a display format to the display generator unit of the display unit. The display format includes a plurality of windows, one of the windows being a control view. The control view (display of the process control system) display information is transmitted to the display generator unit via a second input channel of the display generator unit. Communication checks are made between the display generator unit and the interface apparatus. If an error is detected by either unit, the first input channel is disabled, and the control view is displayed on the entire screen of the display unit and controlled by the display generator unit, thereby guaranteeing the control view is always displayed and the integrity of the process control system is maintained.

6 Claims, 9 Drawing Sheets

METHOD FOR CONTROLLING WINDOW DISPLAYS IN AN OPEN SYSTEMS WINDOWS ENVIRONMENT

RELATED APPLICATIONS

The present application is related to the following:

a) patent application, Ser. No. 07/899,198, entitled "An Open Distributed Digital System" by K. Staggs et al;

b) patent application, Ser. No. 07/899,740, entitled "Priority Based Graphics for a Windows Protocol in an Open Systems Environment", by W. B. Kilgore et al;

c) patent application, Ser. No. 07/899,199, entitled "Directly Connected Display of a Process Control System in an Open System Windows Environment" by B. Kilgore;

d) patent application, Ser. No. 07/899,197, entitled "Device Dependent Layer of a Windows Protocol for an Operator Station of a Process Control System" by B. Kilgore et al;

e) patent application, Ser. No. 07/899,042, entitled "A Method of Coupling Open Systems to a Proprietary Network", by D. Phillips et al;

all of the above filed on even date herewith, and all of the above assigned to Honeywell Inc., the assignee of the present application.

BACKGROUND OF THE INVENTION

This invention relates to distributed digital systems, and more particularly, to distributed digital systems having a plurality of nodes coupled to a network for communicating between nodes, wherein a once closed network is opened to permit a variety of nodes to be coupled to the network.

There currently exists systems having a plurality of nodes operatively connected to a bus or network in which the nodes are developed by a single manufacturer who enforces strict control over the design of the nodes and over the functions to be performed by the nodes. Further, a predetermined protocol is utilized by the network which results in a "closed" environment.

In order to allow a user the option of selecting equipment of other manufactures, having differing protocols, and thereby expanding the capabilities and functionality of these systems, it is desired to have an "open" systems environment which permits the user to connect (directly or indirectly) these equipments of other manufacturers having differing designs to the network of the system. By opening up the system to these equipments, the reliability of the system is now susceptible to any errors (bugs, viruses, ... ) of the new equipment being added which is not under the control of the manufacturer of the system.

Thus, the present invention provides a method for controlling window displays in the open system window environment while maintaining the high reliability that the system had before opening up the environment i.e., guaranteeing that display of the system, as a minimum, is provided to an operator.

SUMMARY OF THE INVENTION

Therefore, there is provided by the present invention, a method for controlling window displays in an open system windows environment. The method of the present invention guarantees the integrity of a process control system display in an open system windows environment. The process control system includes an interface apparatus to at least one foreign system. The interface apparatus receives display information from the foreign system such that the display information from the foreign systems and the display information from a network of the process control system are displayed on a display unit of the process control system. The display unit is driven by a display generator unit such that the display is in a windows format in response to control information from the interface apparatus. The method comprises the steps of, by the interface apparatus, transmitting the display information of the foreign systems to the display generator unit via a first input channel of the display generator unit. Control information is also transmitted to the display generator unit via the first input channel to command a display format to the display generator unit of the display unit. The display format includes a plurality of windows, one of the windows being a control view. An alert command is transmitted to the display generator unit. Upon receiving a response to the alert command, the display generator unit is assumed to be operating correctly and the interface apparatus proceeds to the first step, i.e., the step of transmitting the display information.

The display generator unit receives the display information of the process control system transmitted to the display generator unit via a second input channel of the display generator unit. Further, the display generator unit receives the display and control information of the foreign systems transmitted to the display generator unit via the first input channel of the display generator unit. The display information of the process control system and the foreign system is outputted to the display unit in the display format in accordance with the command information. Upon receipt of the alert command, the display generator unit response to the interface apparatus with an acknowledge command, thereby guaranteeing that the control of the display unit is operational; and then proceeds to the step of receiving the display information.

Accordingly, it is an object of the present invention to provide a method for controlling window displays in an open system windows environment.

It is still another object of the present invention to provide a method for controlling window displays in an open system windows environment such that the high degree of reliability the system had before the environment was opened up is maintained.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 7, which comprises

DETAILED DESCRIPTION

Figure 1:
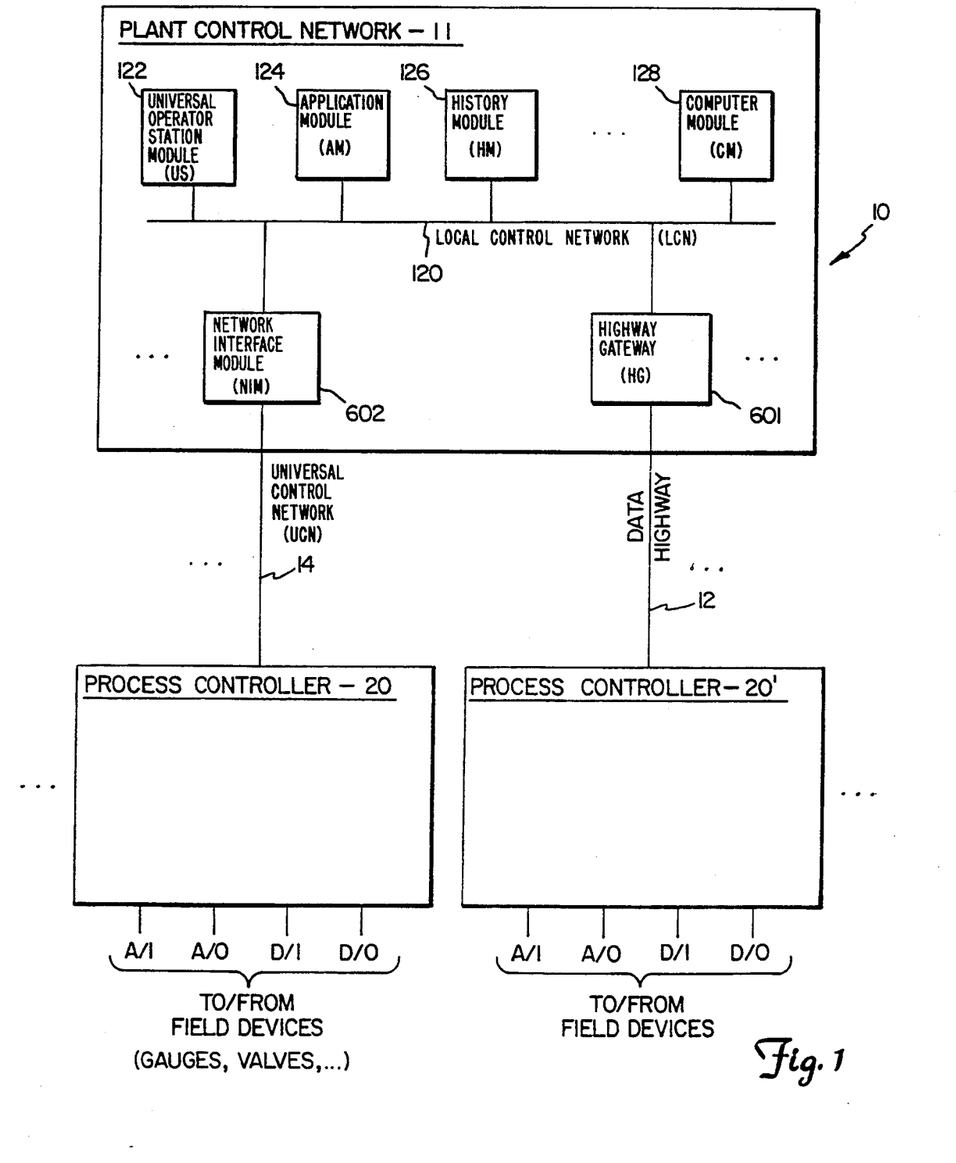
FIG. 1 shows a block diagram of a process control system of the preferred embodiment in which the present invention can be utilized.

Before describing the method of the present invention, it will be helpful in understanding a system environment in which the invention is utilized. Referring to FIG. 1, there is shown a block diagram of a process control system 10 of the preferred embodiment in which the present invention can be found. The process control system 10 includes a plant control network 11, and connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, an interface apparatus which includes many new, additions, improvements, and features over the process controller 20', is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/O, D/I, and D/O respectively) to the process control system 10 from the variety of field devices (not shown) of the process being controlled which include valves, pressure switches, pressure gauges, thermocouples, . . .

The plant control network (or more simply network) 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 and HG 601 provide an interface between the LCN 120 and the UCN 14, and the LCN 120 and the data highway 12, respectively.

Physical modules 122, 124, 126, 128, . . . of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a work station for one or more plant operators. It includes an operator console which is the interface between the plant operator, or operators, and the process or processes of the plant for which they are responsible. Each universal operator station module 122, is connected to the LCN 120, and all communications between the universal operator station module 122, and any other physical module of network 11, is via the LCN 120. Universal operator station module 122 has access to data that is on the LCN 120 and the resources and data available through, or from, any of the other physical modules of network 11. The universal station module 122 includes a cathode ray tube display (CRT) (not shown) which includes a video display generator, an operator keyboard (KB) (not shown), a printer (PRT) (not shown), and can also include (but not shown) a cartridge disk data storage device, trend pen recorders, and status displays, for example.

A history module (HM) 126 provides mass data storage capability. The history module 126 includes at least one conventional disk mass storage device such as a Winchester disk, which disk storage device provides a large volume of nonvolatile storage capability for binary data. The types of data stored by such a mass storage device are typically trend histories, event histories, . . . or data from which such histories can be determined, data that constitutes or forms CRT type displays, copies of programs for the physical modules . . .

An application module (AM) 124 provides additional data processing capability in support of the process control functions performed by the controllers associated with the process control subsystem 20, 20' such as data acquisition, alarming, batch history collection, and provide continuous control computational facilities when needed. The data processing capability of the application module 124 is provided by a processor (not shown) and a memory (not shown) associated with the module.

Computer module (CM) 128 uses the standard or common units of all physical modules to permit a medium-to-large scale, general purpose data processing system to communicate with other physical modules of network 11 and the units of such modules over the LCN 120 and the units of process control subsystems 20, 20' via the highway gateway module 601, and the NIM 602, respectively. Data processing systems of a computer module 128 are used to provide supervisory, optimization, generalized user program preparation and execution of such programs in higher level program languages. Typically, the data processing systems of a computer module 128 have the capability of communicating with other such systems by a communication processor and communication lines.

The local control network 120 (LCN) is a high-speed, bit serial, dual redundant communication network that interconnects all the physical modules of plant control network 11. LCN 120 provides the only data transfer path between the principal sources of data, such as highway gateway module 601, application module 124, and history module 126, and principal users of such data, such as universal operator station module 122, computer module 128, and application module 124. LCN 120 also provides the communication medium over which large blocks of data, such as memory images, can be moved from one physical module such as history module 126 to universal station module 122. LCN 120 is dual redundant in that it consists of two coaxial cables that permit the serial transmission of binary signals over both cables.

Figure 2:
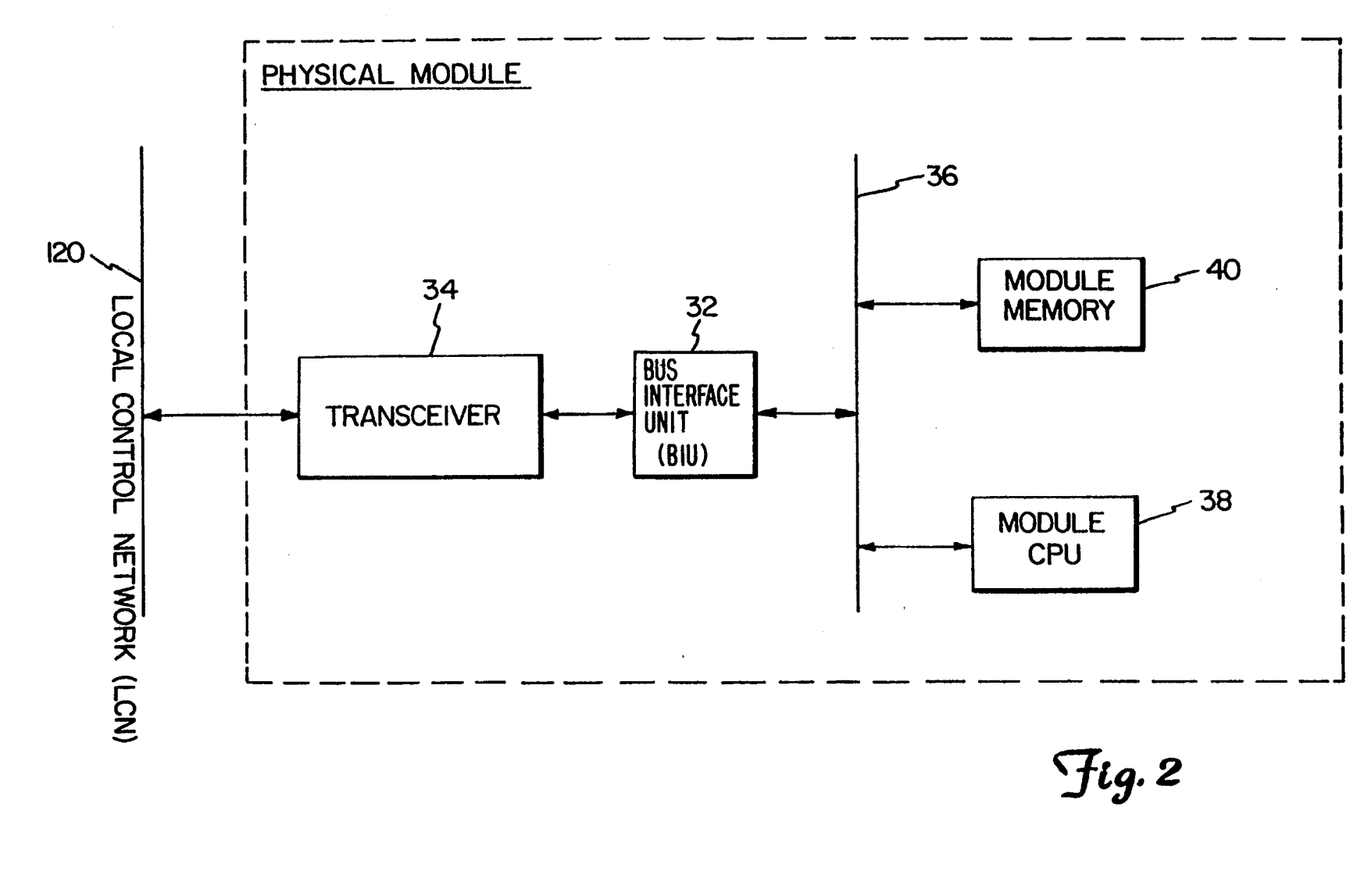
FIG. 2 shows a block diagram of common elements of each physical module of the process control system of FIG. 1.

Referring to FIG. 2, there is shown a block diagram of the common elements of each physical module of the network 11 or the process control system 10. Each of the physical modules includes a module central processor unit 38 and a module memory 40, a random-access memory (not shown), and such additional controller devices, or units (not shown), which are configured to provide the desired functionality of that type of module, i.e., that of the operator station 122, for example. The data-processing capabilities of each module's CPU 38 and module memory 40 create a distributed processing environment which provides for improved reliability and performance of network 11 and process control system 10. The reliability of network 11 and system 10 is improved because, if one physical module of network 11 fails the other physical modules will remain operational. As a result, network 11 as a whole is not disabled by such an occurrence as would be the case in centralized systems. Performance is improved by this distributed environment in that throughput and fast operator response times result from the increase computer processing resources, and the concurrency and parallelism of the data-processing capabilities of the system.

As mentioned above, each physical module includes the bus interface unit, BIU, 32 which is connected to the LCN 120 by the transceiver 34. Each physical module is also provided with the module bus 36 which, in the preferred embodiment, is capable of transmitting 16 bits of data in parallel, between the module CPU 38 and the module memory 40. Other units, utilized to tailor each type of physical module to satisfy its functional requirements, are operatively connected to module bus 36 so that each such unit can communicate with the other units of the physical module via its module bus 36. The BIU 32 of the physical module initiates the transmission of data over LCN 120. In the preferred embodiment, all transmissions by a BIU 32 are transmitted over the coaxial cables which, in the preferred embodiment, form the LCN 120.

Figure 3:
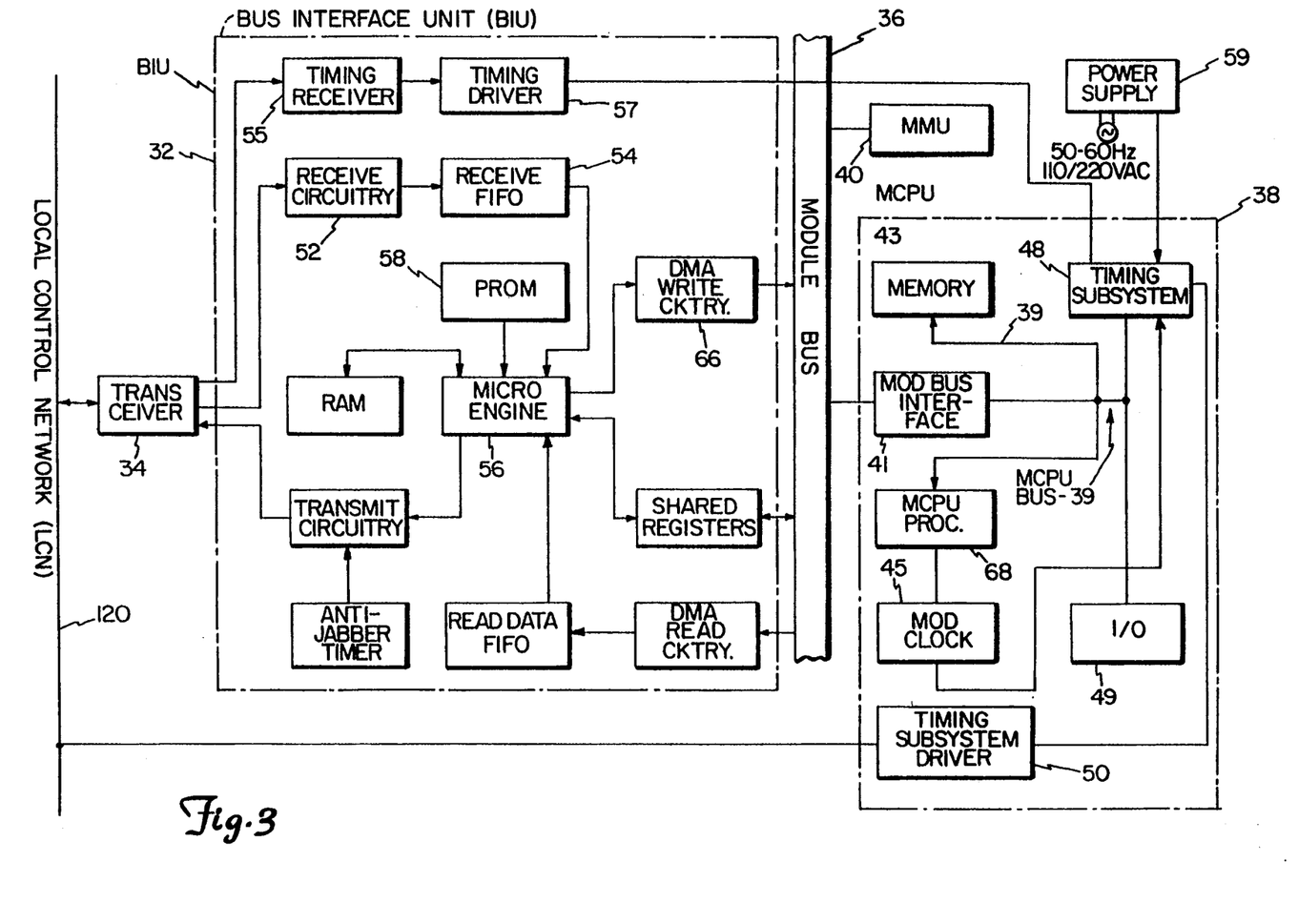
FIG. 3 shows a functional block diagram of a typical physical module of the process control system.

Referring to FIG. 3 there is shown a functional block diagram of a typical physical module 122,124,126, 128 of the plant control network 11, and includes the bus interface unit (BIU) 32 and the transceiver 34, which connects BIU 32 to the LCN 120. BIU 32 is capable of transmitting binary data over LCN 120 and of receiving data from LCN 120. Transceiver 34 in the preferred embodiment, is transformer coupled to the LCN 120. In the preferred embodiment, the LCN 120 is a dually redundant coaxial cable with the capability of transmitting bit serial data. BIU 32 is provided with a very fast micro-engine 56. In the preferred embodiment, micro engine 56 is made up of bit slice components so that it can process eight bits in parallel, and can execute a 24 bit microinstruction from its programmable read only memory (PROM) 58.

Signals received from the LCN 120 are transmitted by transceiver 34 and receive circuitry 52 to receive FIFO register 54. Micro engine 56 examines the data stored in FIFO register 54 and determines if the information is addressed to the physical module. If the data is an information frame, the received data is transferred by direct memory access (DMA) write circuitry 66 by conventional direct memory access techniques to the physical module memory unit (MMU) 40 over module bus 36.

Communication between MCPU processor 68, a Motorola 68020 microprocessor in the preferred embodiment, and other functional elements of MCPU 38 is via local microprocessor bus 39. Module bus interface element 41 provides the communication link between local bus 39 and module bus 36. Processor 68 executes instructions fetched from either its local memory 43, in the preferred embodiment an EPROM, or from MMU 40. Processor 68 has a crystal controlled clock 45 which produces clock pulses, or timing signals. Input/output (I/O) port 49 provides communication between MCPU 38 and equipment external to the physical module to permit program loading, and the diagnosis of errors, or faults, for example.

Each MCPU 38 includes a timing subsystem 48 which, in response to clock signals from module clock 45 produces fine resolution, synchronization, and real-time, timing signals. Any timing subsystem 48 which is provided with a timing subsystem driver 50, has the capability of transmitting timing information to other physical modules over the LCN 120. Another input to each timing subsystem 48, is timing information which is transmitted over LCN 120 and which is received through transceiver 34, timing receiver 55 and timing driver 57 of BIU 32. Timing pulses from module power supply 59 which are a function of the frequency of the external source of A.C. electric power applied to power supply 59 are used by timing subsystem 48 to correct longer term frequency drift of the clock pulses produced by clock 45.

Additional information of the BIU 32 can be found in U.S. Pat. No. 4,556,974. A more detailed description of the process control system 10 can be had by referring to U.S. Pat. No. 4,607,256. Additional information of the individual, common, functional blocks of the physical modules can be had by reference to U.S. Pat. No. 4,709,347, all of the above-identified patents being assigned to the assignee of the present application, and additional information of the process controller 20' can be had by referencing U.S. Pat. No. 4,296,464.

The addition of an interface apparatus which interfaces other systems to the process control system 10 described above and a modification to a graphics generator in the US 122 opens up the existing system, specifically the graphics interface, which includes designing in the capability to readily permit nodes of differing designs to communicate to the network, and will now be described.

Figure 4:
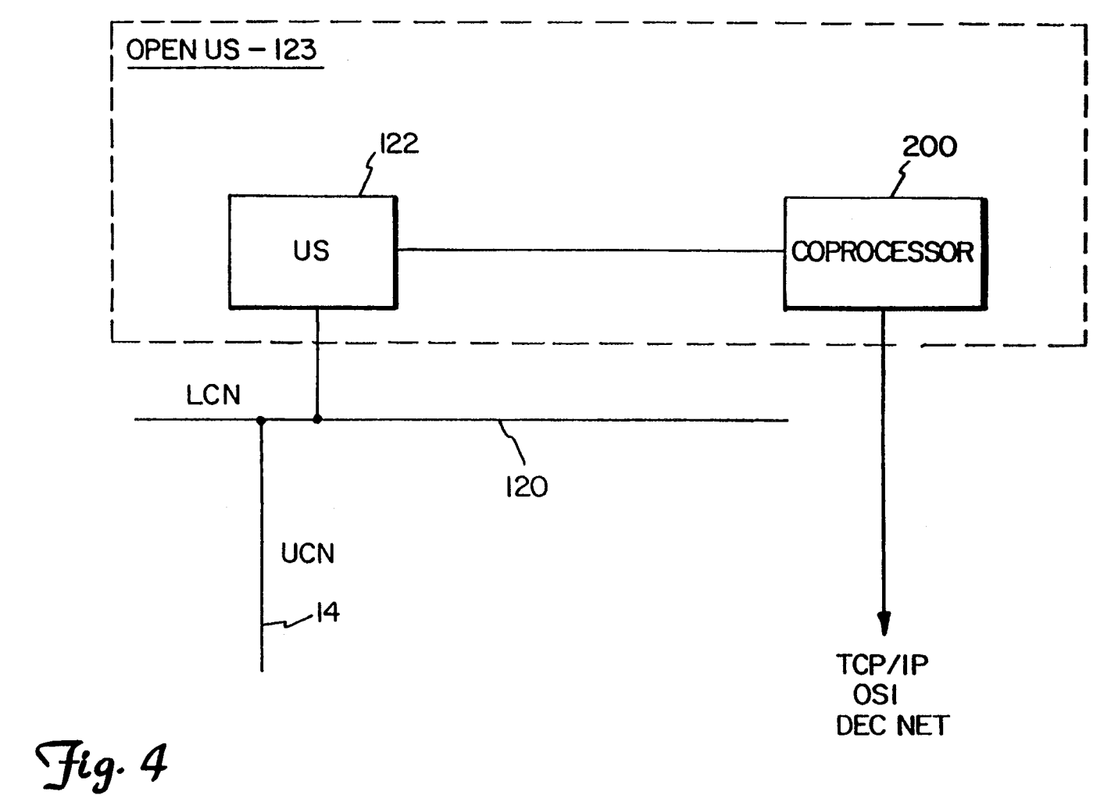
FIG. 4 shows a partial, functional block diagram of the existing system and the opened system of the preferred embodiment of the present invention.

Referring to FIG. 4, there is shown a partial functional block diagram of the existing system and the open (or opened) system. The universal operator station (US) 122 is coupled to a co-processor 200, and the co-processor is coupled to an open system, i.e., interfaces/protocols of differing design, including task control program/interface protocol (TCP/IP), open system interface (OSI), DECnet (a product of the Digital Equipment Corporation of Maynard, Mass.), . . . The universal station 122 is also connected to the LCN 120 as described above. Thus, the new universal operator station (open US) 123 includes the US 122 as described above in conjunction with the co-processor 200. The purpose of the open US 123 is to open the graphical interface to the open systems and to provide information from the closed US to the open systems. The co-processor 200 is structured to permit the interface to other systems, i.e., the open systems without jeopardizing the integrity of the existing system. The co-processor 200 of the preferred embodiment is a Motorola 68040 microprocessor which is executing the UNIX operating systems (UNIX is an operating system of the American Telephone and Telegraph Company, ATT, is readily available and is well known to those skilled in the art), and is sometimes referred to as a UNIX co-processor.

Figure 5:
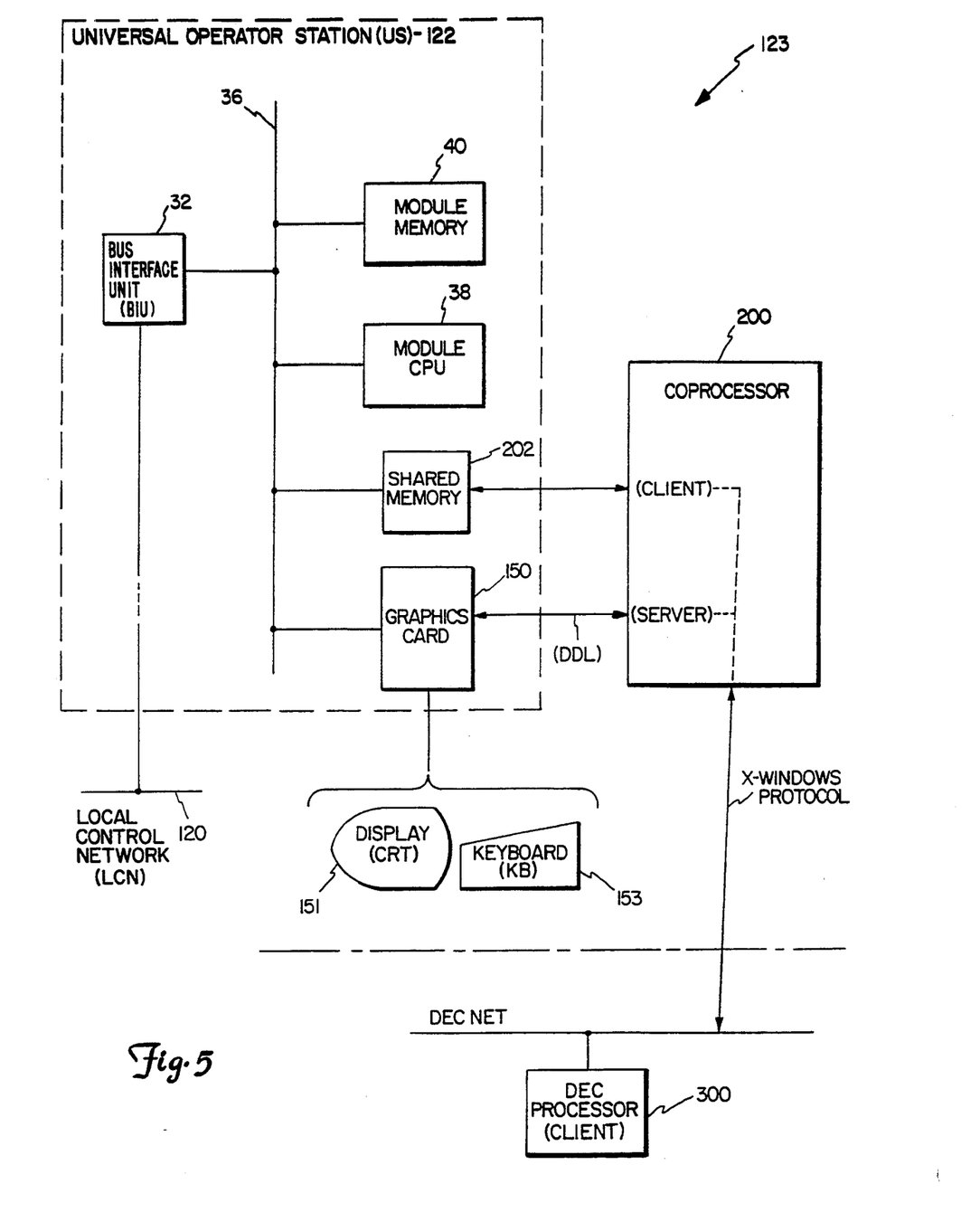
FIG. 5 shows a functional block diagram of an open operator station of the preferred embodiment of the present invention.

Referring to FIG. 5, there is shown a functional block diagram of the open operator station 123 of the preferred embodiment. The operator station 122 as described above includes the BIU 32 connected to the module bus 36, the module memory 40, and the module CPU 38, both also connected to the module bus 36. These basic functional blocks are contained in all the physical modules. Additional functional blocks added to the physical module is what gives the physical module its personality apart from any other physical module. The operator station 122 includes a graphics card 150 which interfaces with a display (CRT) and a keyboard (KB) 151, 153. A shared memory 202 is included and is also connected to the module bus 36 which provides for communication between the co-processor 200 and the US physical module 122 (thereby providing communication to the rest of the process control system 10 via the module CPU 38). Thus, the co-processor 200 requests service (e.g., the value of a point, contents of a file, ... or any information of the process control system 10) of the module CPU 38 through shared memory 202. The module CPU 38 then communicates with the appropriate module to perform the requested service in a normal fashion. Once the response is obtained the information is passed to the co-processor 200 via shared memory 202. Since the module CPU 38 is communicating via the LCN 120, the integrity of the LCN (i.e., the system) is maintained and similarly the module memory 40 cannot be corrupted by the co-processor 200.

Also shown in FIG. 5 is an example open system (or foreign system), for example, a Digital Equipment Corporation system which includes the DECnet network and protocol and a DEC processor 300 attached to the DECnet network. In the preferred embodiment, the communication between the DEC open system and the co-processor 200 is via an X-windows protocol (X-windows being a protocol defined by the Massachusetts Institute of Technology, Cambridge, Mass.) for graphical display information, and other open systems standards being used for data exchange. Any requests of the outside system to the LCN is made via the co-processor 200 through the shared memory 202 to the module CPU 38 as described above.

Figure 6:
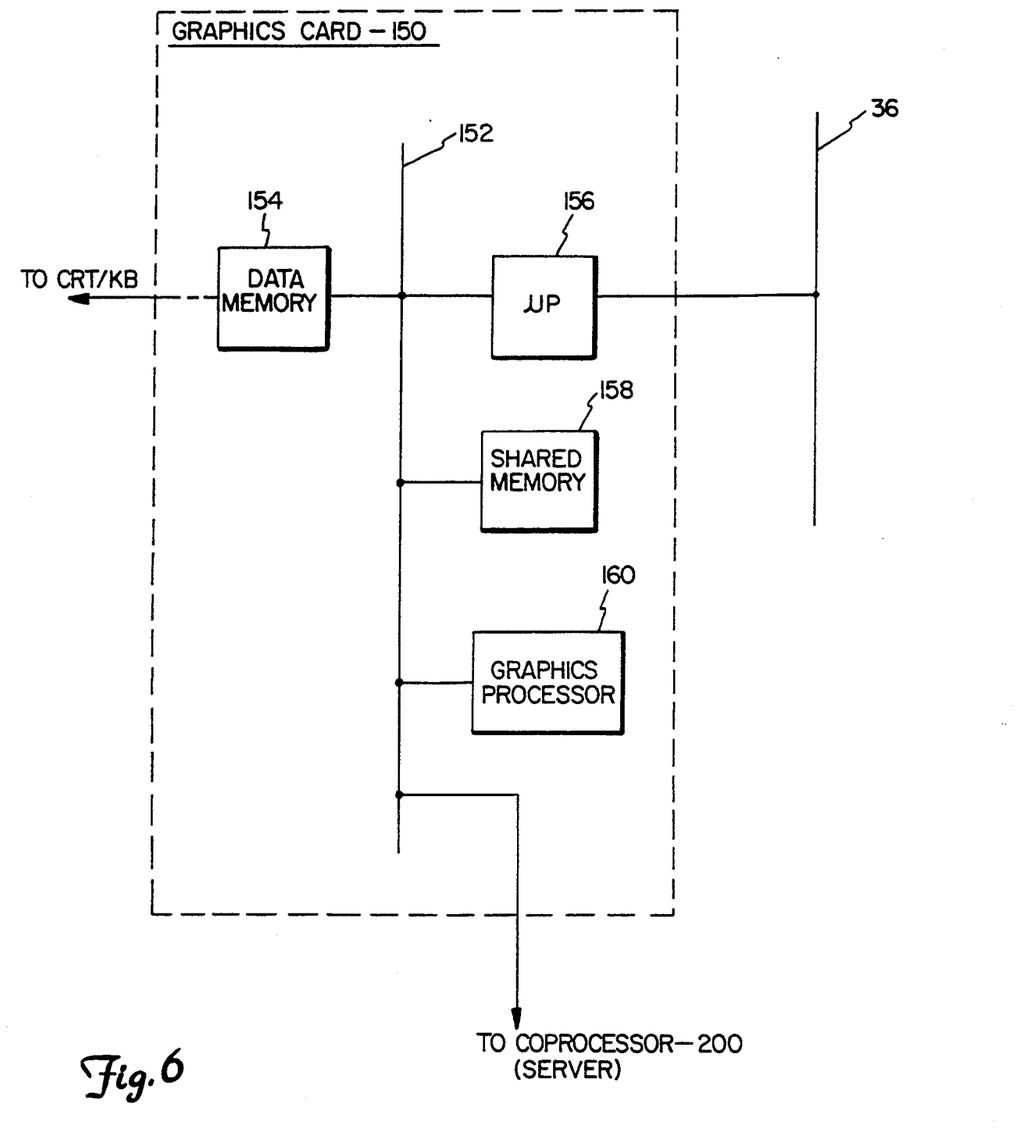
FIG. 6 shows a block diagram of a graphics card of the preferred embodiment of the present invention.

It is also desired to open up the graphics interface such that a display which is not on the LCN can be displayed onto the CRT 151 of the US 122. This is achieved by the interface to the graphic card 150 from the co-processor 200. Referring to FIG. 6, there is shown a block diagram of the graphics card 150 of the preferred embodiment. The graphics card includes a card bus 152. Attached to the card bus 152 is a data memory 154 which contains the information which is to be displayed onto the -CRT, and also contains some control information. A microprocessor 156 is also coupled to the card bus 152 and further is coupled to the module bus 36. A graphics processor 160 is coupled to the card bus 152 and performs all the processing for developing the information stored in the data memory 154, including some control functions. A shared memory 158 is coupled to the card bus 152. A connection is made from the card bus 152 to the co-processor 200, thereby providing the interface mentioned above to the graphics card 150 from the co-processor 200. The microprocessor 156 of the preferred embodiment of the graphic card 15 is a Motorola 68020 processor. The graphics card 150 is a two port graphics card, one port of the graphics card being tied to the module bus 36 which is how a display is driven from LCN. The LCN 120 provides a "single window to the process," i.e., a screen display of what the process/process control system is doing. The second port is coupled to the co-processor 200 and provides the windows interface for the universal station 122. The windows interface is the X-windows interface which is well defined and well known to those skilled in the art (the interface being defined by MIT, Cambridge, Mass.). It is through the interface from the co-processor 200 that all the window displays [i.e., the screen display(s) of the open system(s)] and windows controls are performed, including commands to the graphic card 150 to specify where to place the single window to the process on the screen of the CRT 151. The interface between the graphics card 150 and the co-processor 200 is the full windows interface. One of the windows is the display referred to above as the "single window to the processor" (sometimes referred to as the LCN window). The co-processor 200 commands the graphics card 150 where the LCN window is to be placed on the CRT 151 and its relative size on the display. X-windows is a well defined protocol of how to communicate with the graphics card 150 (or any graphics card) and display, and a computer permitting many windows to be displayed. This includes displaying at least one window from the LCN and/or at least one window from the open system 300. In this system, a server is defined in X-windows as the machine that is driving the display (or that portion of the co-processor 200 which interfaces to the graphics card 150), and a client is the application program, in the present embodiment, the DEC processor 300.

The client 300 can have data which is desired to be displayed. The client 300 communicates with the server portion of the co-processor 200 through an X-windows protocol indicating data to be displayed. The server portion of the co-processor 200 communicates with the graphics card 150 through a device dependent layer (DDL) and is provided by the vendor of the graphics card, or in X-windows is via DDX protocol. The microprocessor 156 maintains the integrity of the card bus 152 into the data memory 154. The processing of the data to be displayed on the CRT 151 is performed by the graphics processor 160. When a predetermined data screen is to be displayed, the microprocessor 156 (which accepts requests from the LCN 120 via module bus 36) places the data in shared memory 158, and is subsequently processed by the graphics processor 160, and is then stored in data memory 154. When the open system 300 (via the client) desires to display some information, the information is communicated to the server portion of the co-processor 200 which then stores the information in the shared memory 158. The graphics processor 160 then processes that information and stores it in the data memory 154 for display. In that manner, and under the control of the graphics processor 160, the plurality of displays, i.e., windows, is displayed on the CRT 151.

It will be understood by those skilled in the art that the X-window protocol is essentially the open interface standard, the X-window protocol being readily available and well known to those skilled in the art. In the preferred embodiment the UNIX operating system is utilized, the UNIX operating system being able to run on many commercially available processors. Further information on the preferred embodiment of the graphics card 150 of the preferred embodiment of the US 122 can be had by reference to U.S. Pat. Nos. 4,490,797 and 4,663,619, although it will be understood that any graphics card can be utilized as discussed above. The graphics processor 160 of the preferred embodiment of the present invention is a Texas Instruments (TI) TMS 34020. The microprocessor 156 and the module CPU 38 is a Motorola 68020. The co-processor 200 of the preferred embodiment of the present invention is a Motorola 68040, having bus capability with the other microprocessors of the system. It will be understood that a variety of processors can be utilized including a reduced instruction set processor which is available from Hewlett Packard among other processor manufacturers.

Although the preferred embodiment utilizes the UNIX operating system, it will be recognized by those skilled in the art that any operating system can be utilized, including OSF1, Open Systems Foundation/USA, Cambridge, Mass. Although the co-processor 200 is controlling the display in the preferred embodiment the graphics card can also perform the display control. Since X-windows was readily available and performed the desired display control function, X-windows was utilized to take advantage of the availability of the desired control function. It will be recognized by those skilled in the art that implementation of the present invention is not limited to X-windows, and that any protocol can be utilized.

Thus it can be seen that the process control system 10 is open system permitting other system to interface into the LCN of the process control system and, because of the communication scheme as described above, the integrity of the process control system 10 is maintained.

The present invention, which will now be described, addresses the function, i.e., method, that is performed that is essentially by the graphics card that guarantees that the graphic view (control view) to a field device (i.e., valve, . . . ) or any other controls view of the process control system on the display unit is always maintained regardless of the operational state of the co-processor 200. If the co-processor 200 is running and controlling the display unit 151 (and in particular the actual display on the screen of the display unit 151) and a malfunction occurs or some other anomaly occurs to the co-processor 200, the function of the graphics card 150 guarantees that a single view of the process control system is maintained. As discussed above, the co-processor is connected into the US 122 and has and controls a graphical interface through the display 151 and keyboard 153.

Figure 7A:
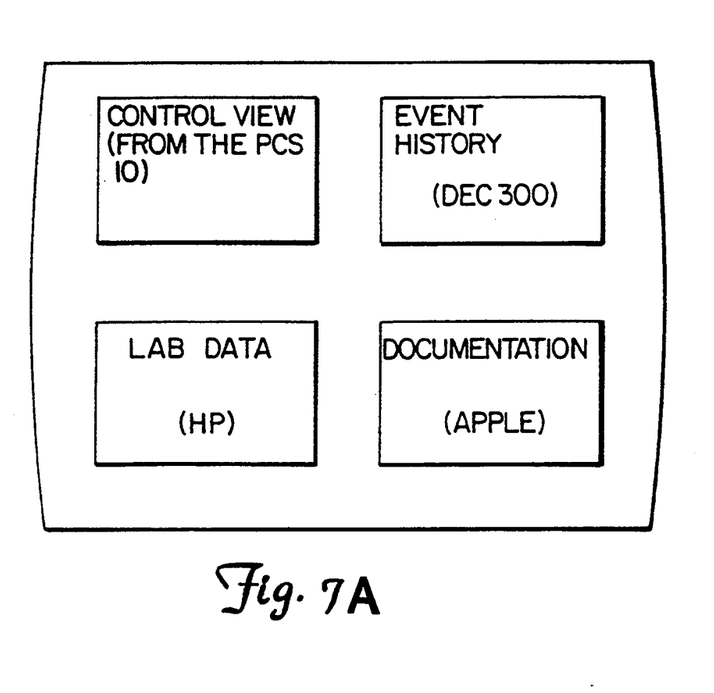
FIGS. 7A and 7B, shows examples of screen displays of the display unit of the process control system.
Figure 7B:
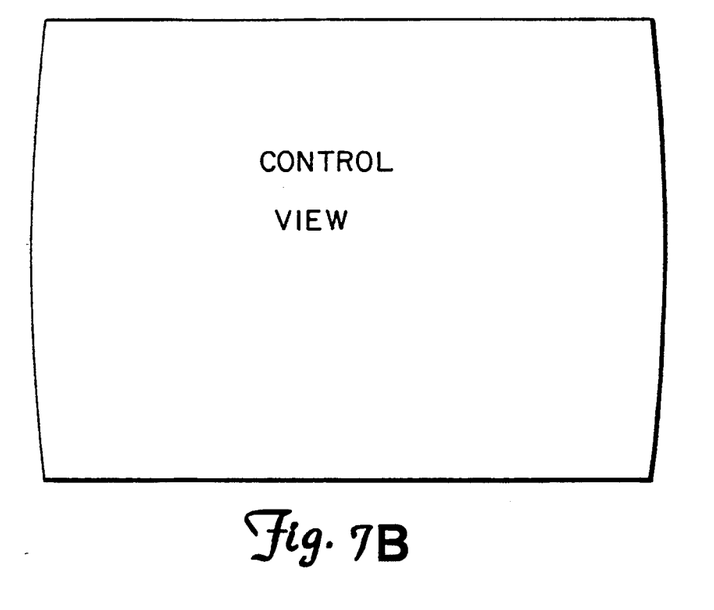

Referring to FIG. 7, which comprises FIGS. 7A and 7B, there is shown an example of two displays of the display unit 151. FIG. 7A shows an example of a typical normal display and FIG. 7B shows a display when an anomaly occurs with the co-processor 200, or the fallback display. FIG. 7A shows, for example, the windows which can be displayed. The windows always include a "view of the process" i.e., a control view from the process control system 10. Also included can be, for example, a window showing event history (a process control system application) coming from an outside system, running a process control system application, for example a DEC computer system 300 as shown in FIG. 5. Another window can be data coming from another outside computer system (not shown), for example such as an Apple computer. This computer system can be running another application program referred to as documentation (in the preferred embodiment of the process control system the documentation of the process control system is created on an Apple computer). Still another window can be displayed, for example, lab data, coming from a Hewlett Packard computer system. The windows, except for the control view, are displayed on a single screen of the display unit 151, the display information for these windows coming from a number of outside computer systems connected into the co-processor 200. If an error is detected with the co-processor 200, the method of the present invention guarantees that the display windows from the outside systems are inhibited and the control view is the only display shown and is zoomed to take up the entire screen of the display unit 151. This observation also serves as an indication to the operator that a malfunction has occurred with the interface to the outside systems.

The graphics card 150 has two input communications channels, as discussed above, a first channel is to the LCN 120 via the microprocessor 156/module bus 36 and a second channel is to the co-processor 200 via the microprocessor 156/card bus 152. The first channel is a fail safe channel and utilizes all the same mechanisms that is utilized by the LCN 120. The microprocessor 156 of graphics card 150 grants the communication of the first channel (i.e., the channel to the LCN 120) a higher priority than that of the second channel. The data received from the first channel is maintained securely by the graphics card 150 in order to insure that the co-processor 200 cannot corrupt that data, i.e., the co-processor 200 does not have direct access to the module memory 40 and the data memory 154.

The second channel provides, in the preferred embodiment of the present invention, the X-windows environment, i.e., the open systems OSF (Open Systems Foundation Standard). Also as has been mentioned above, the X-windows is a standard which defines a protocol between different computer systems to allow them to display from any of the computers connected to the display, thereby being able to achieve the windows display as discussed above in conjunction with FIG. 7.

The present invention is a method which guarantees that the control view will always be maintained. Therefore, if any malfunction occurs to the machines on the outside network to cause the co-processor 200 to malfunction (i.e., X-windows to crash), the control view is the primary (or fallback) view to the operator. The process control system 10 (i.e., the modules of the process control system 10 and specifically the operator station 122) takes control of the graphics and displays the control view. The reliability of the process control system is very high, thus it is highly certain that the control view can always be displayed. The control view display data comes from the LCN totally independent of the co-processor 200 of the opens systems network. However, everything else on the display comes from the open systems network. In the preferred embodiment of the present invention, i.e., the X-windows environment, the co-processor 200 is controlling the windows the co-processor 200 is communicating with the graphics card 150, i.e., passing along all the data collected from the open systems network and passing along the control display information, thereby controlling the display. However the co-processor 200 is not drawing the control view, but is controlling where on the screen the control view is displayed.

The display example of FIG. 7 has all the display information and control information stored in the data memory 154 of graphics card 150. The control view data is inputted into the data memory 154 of graphics card 150 from the LCN 122 by a module bus 36 and microprocessor 156. All the display data of the other views is inputted to the graphics card 150 from the co-processor 200. This data is stored in the data memory 154 via card bus 152, shared memory 158, and graphics processor 160. The graphics processor 160 is processing the inputs and storing the results in the data memory 154 in a predetermined format consistent with the control commands from the co-processor 200 and in a format consistent with the information as is anticipated by the display unit 151.

Figure 8:
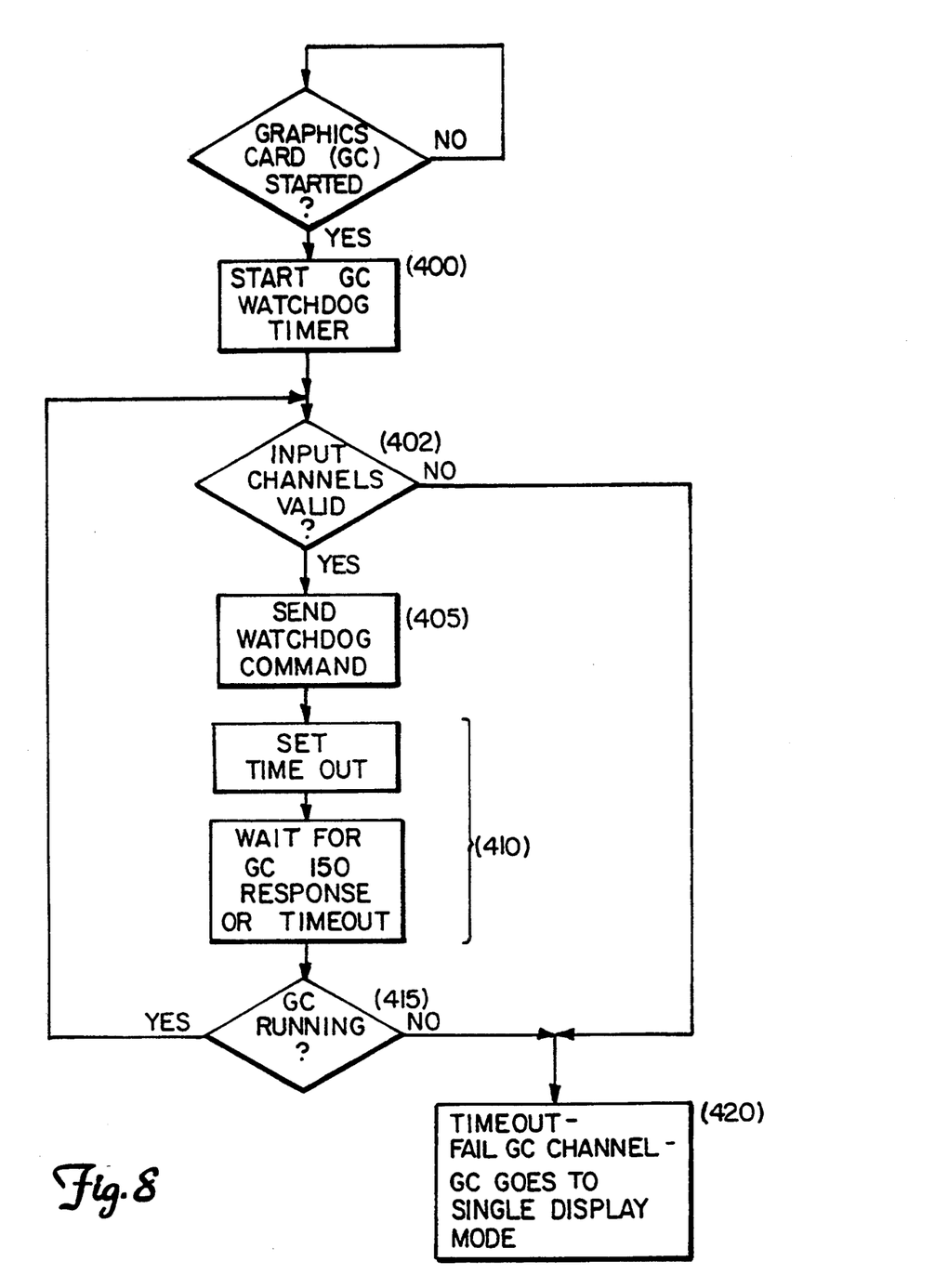
FIG. 8 shows a flow diagram of the interface apparatus display processing.
Figure 9:
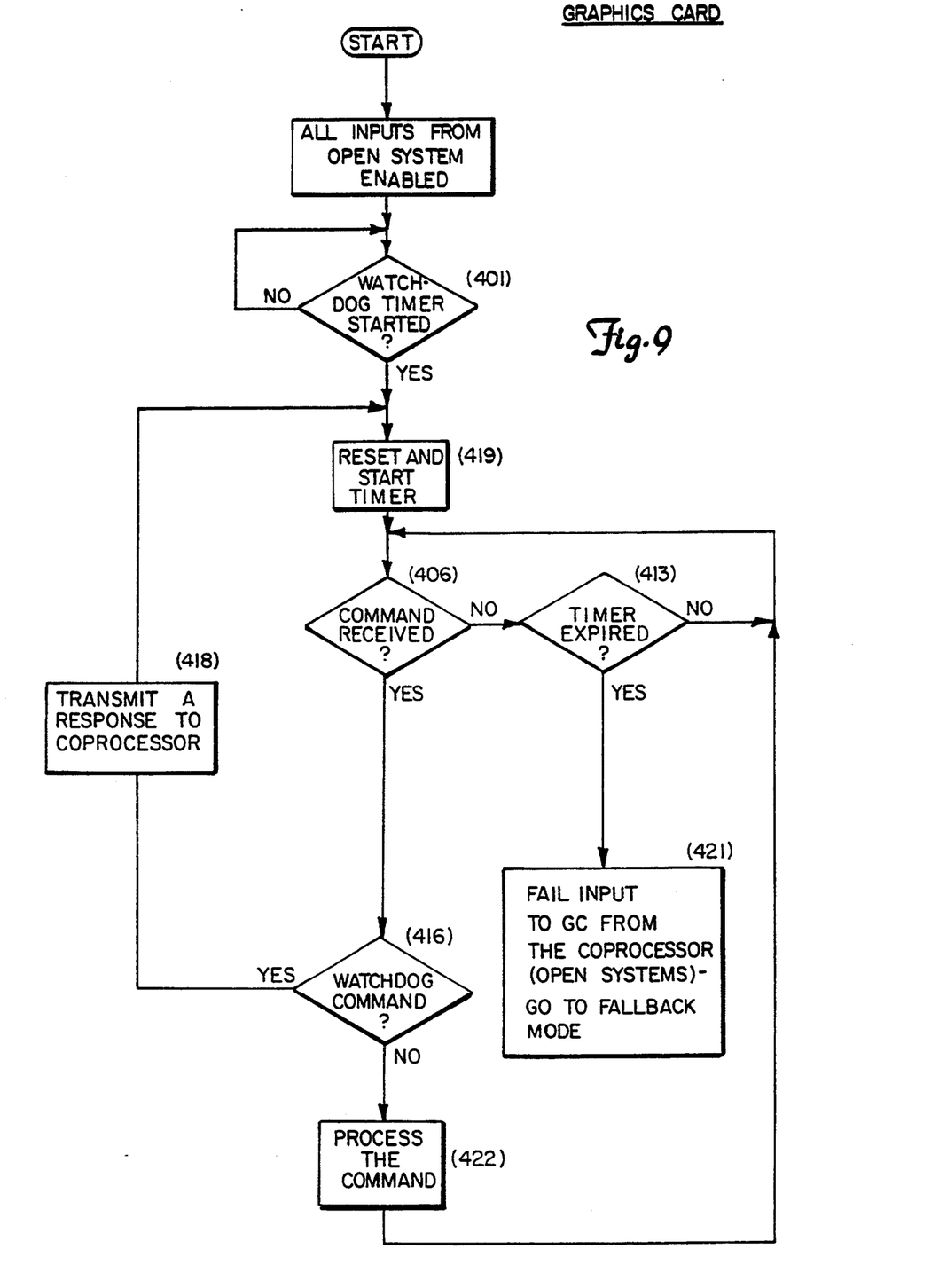
FIG. 9 shows a flow diagram of the graphics card display processing of the process control of the preferred embodiment.

Referring to FIGS. 8 and 9, there is shown an overview flow diagram of the co-processor 200 and graphics card 150, respectively, relating to the display handling. Between the co-processor 200 and the graphics card 150, watchdog timers are running, blocks 400, 401. The co-processor 200 is periodically sending alert messages (watchdog commands) to the graphics card 150 (block 405), and must be responded to within a predetermined time (block 410). If no response is received (block 415), the co-processor 200 declares that the graphics card 150 has failed and sends a special message to the graphics card 150 such that the connection with the co-processor 200 is essentially disabled, removes all the displays from the open system network, and causes the control view to zoom such that the control view is the only display shown and takes up essentially the entire screen display 151 (block 420). Before sending the watchdog command (block 405, the co-processor 200 checks the validity of the input channels (block 402). In the preferred embodiment, predetermined locations of shared memory 202 are checked to verify contents are valid, i.e., memory pointers. If the validity check passed, the processing continues to block 405, otherwise a failure is indicated and the processing continues to block 420. As mentioned above, this is also a rapid indication to the operator that something has happen to the communications from the opening system network yet still displaying the control view.

Additionally, the alert message must be received from the co-processor 200 at a predetermined interval, and if the message is not received during the predetermined interval the graphics card 150 declares the co-processor 200 has failed and transmits a message to the co-processor 200 that no more messages will be accepted and exhibits only the control view as described above (block 421). The co-processor 200 goes through a reinitialization to get back on line. When a command is received by the graphics card (block 406), a check is made to determine if the command received is a watchdog command, the graphics card transmits a response to the co-processor 200 (block 418), and resets and restarts the timer (block 419). If the command received is not a watchdog command (block 416), the command is processed (block 422), and the process continues back at block 406 waiting to receive additional commands. If no command is received within the time interval (block 413), the graphics card essentially stays in a wait loop (in so far as the display processing is concerned) and waits to receive a command.

Thus, in accordance with the method of the present invention, it can be readily seen that the integrity of the process control system 10 is maintained. Further, the control view, i.e., a view from the process control system is maintained independent of anything that happens on the open system network.

While there has been shown what is considered the preferred embodiment of the present invention, it will be manifest that many changes and modifications can be made therein without departing from the essential scope and spirit of the invention. It is intended, therefore, in the annexed claims to cover all such changes and modifications that fall within the true scope of the invention.

We claim:

1. A method for guaranteeing that a display of a process control system in an open system windows environment has an integrity of at least a minimum predetermined level, wherein the process control system includes an interface apparatus to at least one open system, the interface apparatus receiving first display information from the open system such that the first display information from the open systems and a second display information from a network of the process control system are displayed on a display unit of the process control system via a display generator unit thereby forming a display in a windows format in response to control information from the interface apparatus, the method comprising the steps of:

by the interface apparatus:
  a) transmitting the first display information of the open systems to the display generator unit via a first input channel of the display generator unit;
  b) transmitting the control information to the display generator unit via the first input channel to command a display format to the display generator unit of the display unit, said display format including a plurality of windows, one of said windows being a control view, which displays the second display information of the process control system;
  c) transmitting an alert command to the display generator unit;
  d.1) waiting for a response to the alert command from the display generator unit;
  d.2) during the wait:
    i) if the alert response is received within a first predetermined time period and if there is new display/control information to be transmitted, proceeding to step (a);
    ii) if the response is received within the first predetermined time period and there is no new display/control information to be transmitted, proceeding to step (c);
    iii) if the response is not received within the first predetermined time period:
      1) transmitting an error message to the display generator unit;
      2) causing the control information to be modified such that the display format indicates a removal of the plurality of windows for displaying the first display information of the open systems;
      3) zooming the control view such that the control view takes up the entire display of the display unit in a single window; and
      4) disabling the first input channel; and
  d.3) placing the interface apparatus in an idle mode such that no display information is accepted by the interface apparatus; and
  e) proceeding to step (a); and by the display generator unit;

f) receiving the second display information of the process control system transmitted to the display generator unit via a second input channel of the display generator unit;

g) receiving the first display and control information of the open systems transmitted to the display generator unit via the first input channel of the display generator unit;

h) outputting the first and second display information of the open system and the process control system, respectively, to the display unit in the display format in accordance with the command information;

i) upon receipt of the alert command, responding with an acknowledge command to the interface apparatus, thereby guaranteeing that the display unit is operational; and j) proceeding to step (f).

2. A method for guaranteeing the integrity of a process control system display according to claim 1, wherein the step (i), responding with an acknowledge command of the display generator unit, further comprises the steps of:

a) waiting for a command from the interface apparatus;

b) if no command is received, verifying that a second predetermined time period has not transpired since receipt of a previous alert command;

c) if a command is received, determining if the command is an alert command;

d) if the command is an alert command,
 i) transmitting a response back to the interface unit;
 ii) resetting a timer which indicates a start of a running time period used to compare against the second predetermined time period;
 iii) starting the timer; and
 iv) proceeding to step (a) of claim 2;

e) if the command is not an alert command, processing the command and proceeding to step (a) of claim 2.

3. A method for guaranteeing the integrity of a process control system display according to claim 2, further comprising the steps of;

after the receipt of a command, verifying that a second predetermined time period has not transpired since receipt of a previous alert command.

4. A method for guaranteeing the integrity of a process control system display according to claim 3, wherein step b of claim 3, the step of verifying, further comprises the steps of;

a) if the second predetermined time has expired, transmitting a message to the interface apparatus indicating no further inputs will be accepted, thereby effectively disabling the first input channel; and b) causing the display in the windows format to zoom the control view such that the control view takes up the entire display of the display unit in a single window, thus keeping only the second input channel active, thereby preventing the open systems from undermining the integrity of the process control system and guaranteeing that the control view of the process control system is maintained.

5. A method for guaranteeing the integrity of a process control system display according to claim 1, further comprising the step of:

prior to transmitting the display information of the open system to the display generator unit via a first input channel, checking that the first and second input channels are operable.

6. A method for guaranteeing the integrity of a process control system display according to claim 5, wherein the step of checking further comprises the steps a) verifying validity of predetermined locations of a memory shared by the interface apparatus and the process control system; and b) if the verification is valid, processing normally, otherwise, proceeding to step d.2, iii, 2 of claim 1.

* * * * *